July 21, 1970 KIYOSHI KURATA ET AL 3,521,161

APPARATUS FOR DISPLAYING WIRING INSTRUCTIONS AND CHECKING CONNECTIONS MADE IN WIRING ELECTRICAL CIRCUITRY

Filed June 11, 1968

United States Patent Office 3,521,161
Patented July 21, 1970

3,521,161
APPARATUS FOR DISPLAYING WIRING INSTRUCTIONS AND CHECKING CONNECTIONS MADE IN WIRING ELECTRICAL CIRCUITRY

Kiyoshi Kurata and Koichi Shimizu, Kamakura, Japan, assignors to Mitsubishi Denki Kabushiki Kaisha, Tokyo, Japan Filed June 11, 1968, Ser. No. 736,105
Claims priority, application Japan, June 13, 1967, 42/50,309
Int. Cl. G01r *31/04*
U.S. Cl. 324—66 1 Claim

ABSTRACT OF THE DISCLOSURE

The informations for many terminals to be wired are coded on a punched tape in accordance with the sequence of the steps of the particular wiring operation. An operating device is operated to visibly display the information for a first one of the terminals on a visible display device through a control device while at the same time an electrical signal corresponding to the information is applied to the first terminal through one of connection signal cards operatively connected to that terminal. When a wire wrap tool engages the first terminal the information previously applied to the first terminal is supplied to control device through a lead extending from the tool to the control device which, in turn, actuates a buzzer indicating that a correct wiring has been accomplished. The process just described is repeated with the remaining terminals while the display on the display device is revised each time the operating device is operated. The engagement of the tool with any incorrect terminal results in no buzzer and in the suspension of the succeeding operation.

BACKGROUND OF THE INVENTION

This invention relates to a wiring apparatus by which in a wiring operation commands listed in the particular wiring list are successively displayed on a visible display device while the corresponding electrical signals are also successively applied to terminals to be wired thereby to automatically confirm the correct wiring to the respective terminals.

In the conventional type of computers or the like each set of printed cards has been generally disposed in one logic bay including from several tens to several hundreds of plugs contacting the printed cards disposed therein with each contact plug including several tens of terminals. Therefore the number of terminals has totalled from 4,000 to 15,000 for each bay. The wiring of such bays has been heretofore accomplished by reading a wiring list instructing positions to be wired in the bays while successively connecting an electric wire to the designated terminals through the use of a wire wrap tool serving as a tool for winding and connecting a length of wire around and to individual one of the terminals.

Although the conventional wiring operation as above outlined has been simple in itself, the operator has not only born a high mental burden leading to a decrease in operational efficiency but also incorrect reading from the wiring list has caused many incorrect wirings resulting in the necessity of testing again the entire wiring and correcting incorrectly wired portions after the completion of the wiring operation. In addition, even after that correction was made, incorrectly wired portions might be often found. Therefore the conventional wiring operation was disadvantageous in that the complete elimination of incorrect wiring required a very much labor and large time consumption.

SUMMARY OF THE INVENTION

Accordingly it is an object of the invention to provide an improved wiring apparatus eliminating any incorrect wiring due to incorrect reading from a wiring list as in the prior art apparatus whereby the correct wiring is accomplished.

The invention accomplishes the above object by the provision of apparatus comprising, in combination, a tape reader for reading out from a punched tape, coded wiring instructions for connections to terminals of an electrical element to be wired, checking means connected to the tape reader for checking the correctness of the wiring instructions, decoding means connected to the checking means for decoding the wiring instructions, memory means connected to the decoding means for memorizing the decoded wiring instructions, display means connected to the memory means for visually displaying the decoded wiring instructions, control means connected to the tape reader and to the memory to control the operation of the tape reader and memory means, a wire wrap tool for making connections to the terminals of the electrical element in accordance with the wiring instructions displayed on the display means, signal cards for applying a signal to a selected terminal to be wired in accordance with the displayed wiring instructions, means connecting the wire wrap tool with the control means for transmitting to the control means a confirmation signal when the wire wrap tool engages the terminal selected by the signal cards and an alarm signal when the tool engages a terminal other than the selected terminal, indicating means for indicating when a correct connection has been made, alarm means connected to the control means for giving an alarm when an incorrect connection is made, operating means connected to the control means for advancing the tape reader to instructions for the next connection and for erasing previous instructions from the memory means, and means for locking the operating means until a confirmation signal has been transmitted from the wire wrap tool to the control means.

BRIEF DESCRIPTION OF THE DRAWING

The invention will become more readily apparent from the following description taken in conjunction with the accompanying drawing in which.

DESCRIPTION OF THE PREFERRED EMBODIMENT

Figures 1, 2:
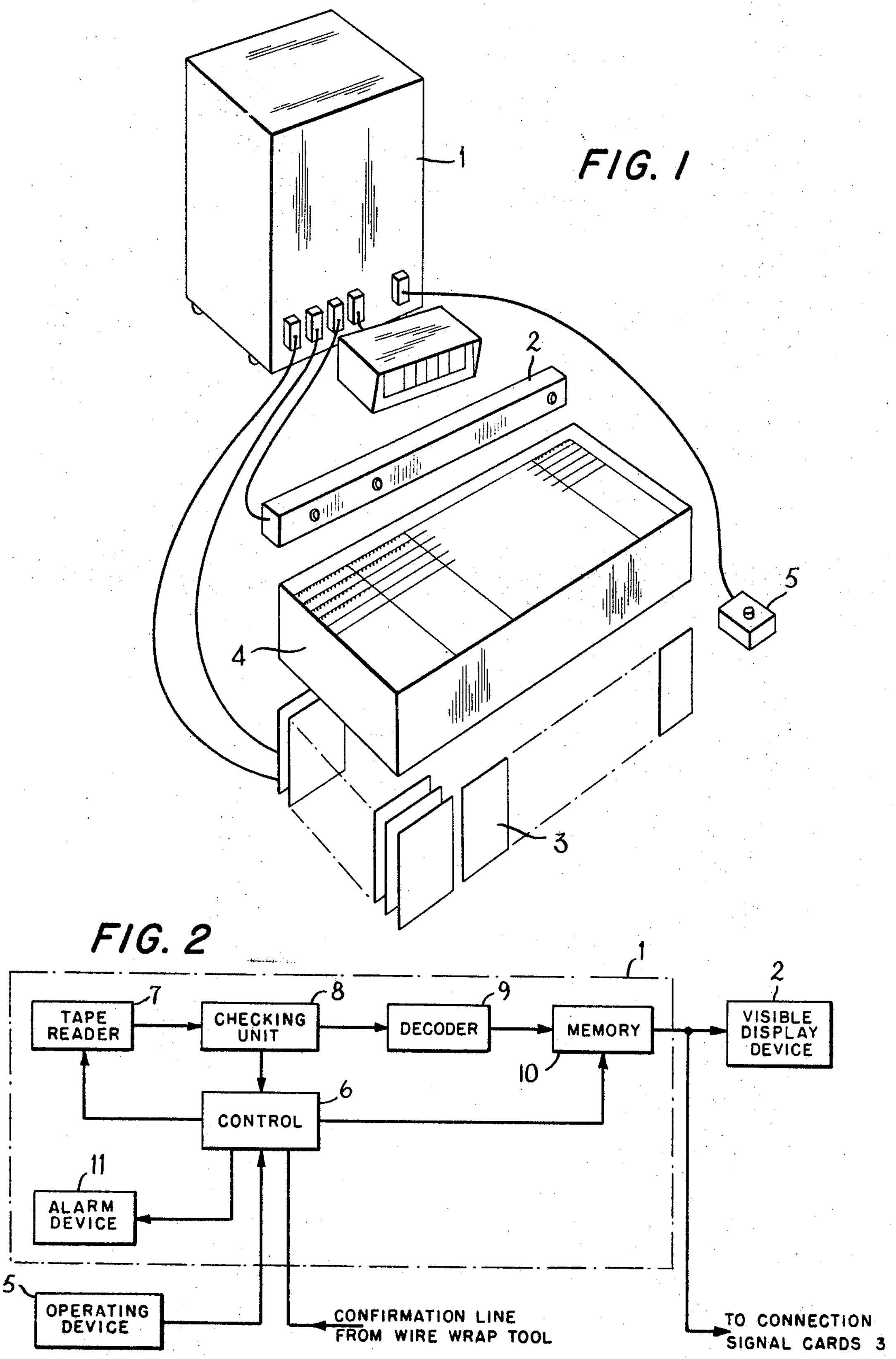
FIG. 1 is a diagrammatic perspective view of a wiring apparatus constructed in accordance with the principles of the invention.
FIG. 2 is a block diagram of a control divice shown in FIG. 1.

Referring now to the reference numerals denoted in FIG. 1 of the drawing, 1 designates a control device, 2 a visible display device, 3 a set of connection signal cards, 4 a bay to be wired, and 5 designates an operating device, as shown in FIG. 2, the control device enclosed with a dot-and-dash rectangle 1 comprises a control 6, and a tape reader 7 controlled by the control 6 and electrically connected to the visible display device 2 through a checking unit 8, decoder 9, and a memory 10 serially connected in the named order. The control 6 further controls both the memory 10 and an alarm device 11 in the manner as will be described hereinafter.

In practicing the invention, the particular wiring list is first stored in the form of punches in any suitable tape made, for example, of paper and the punched tape (not shown) is disposed in the tape reader 7. Under these circumstances an operator (not shown) is positioned on the front side as viewed in FIG. 1 of the bay 4 and will perform the particular wiring operation.

In order to initiate the wiring operation the operator can depress a pushbutton on the operating device 5 to apply an operating signal to the control 6. This permits the tape reader 7 to read out from the punched tape the information or data representing the serial number of that terminal to be now wired and the like. Simultaneously the memory 10 receives a control signal from the control 6 but there is no effect upon the memory because it is assumed that it has now no information stored therein. The data thus read out is applied to the checking unit 8 where they undergo a check such as the parity check or the like. If the checked data have been found to be correct then they are supplied to the decoder 9 to be converted to a decimal number and a predetermined code prescribed to the terminal to be now wired which is, in turn, stored in the memory 10.

Alternatively if the checking unit 8 has detected the incorrectness of the data applied thereto the same is operated to actuate the alarm device 11 through the control 6 to provide an alarm signal. This results in the suspension of the subsequent steps of the wiring operation. In this case the operator can check the apparatus and remove a failure or failures whereby the operation is again started.

The data in the form of a decimal number and a predetermined code stored in the memory is then supplied to and visibly displayed on the visible display device 2 while being left intact. The operator can now know what terminal has to be wired through the inspection of the display on the device 2. At the same time the data are also supplied to that terminal to be wired in the bay 4 through the associated connection signal card 3 in the manner as will be apparent later.

Under these circumstances the operator will insert a tip of a wire wrap tool of the conventional construction (not shown) into that terminal corresponding to the information now displayed on the visible display device 2. Then the signal previously applied to the said terminal reaches the control 6 through an confirmation line (see FIG. 2) extending from the tool to the control whereupon the control 6 actuates a buzzer (not shown) to ring it indicating that terminal has been correctly connected. Thus a correct wiring to the terminal has been completed.

To make a connection to the succeeding terminal, the operator depresses again the pushbutton on the operating device 5. This causes the tape reader 7 to read out the information for the succeeding or second terminal from the punched tape (not shown) through the operation of the control 6 whereupon the process as above described is repeated. In this case, however, it is to be noted that a control signal from the control 6 is applied to the memory 10 to clear out it and therefore erase the display on the visible display device 2 with the result that the new data can be visibly displayed on the device 2 without any delay. In other words, the depression of the pushbutton on the operating device 5 also serves to revise the display on the device 2. According to the visible information displayed on the visible display device 2 the operator can accomplish a wiring to the corresponding terminal as in the case of the first terminal. Thereafter the process as previously described is repeated with the remaining terminals.

If the wire wrap tool engages an incorrect terminal no buzzer is produced. Under these circumstances, even if the pushbutton on the operating device 5 is depressed for the purpose of performing the subsequent wiring operation, the process as previously described will not proceed. This indicates that the tool should reengage the correct terminal.

It is to be understood that the connection signal cards 3 are prepared one for each contact plug in one bay to be wired and inserted into the respective contact plugs in the bay 4 although the cards 3 are shown in FIG. 1 as being separated from the plugs only for purpose of illustration. Each card 3 is adapted to respond to signals supplied thereto from the memory 10 and representative of the serial number and the like of the terminals and the bay as associated with the said card to supply signals only to the terminals to be wired, for example, through a logic circuit printed on the card.

The invention has several advantages. For example, the automatic confirmation of correct wiring as previously described permits any incorrect wiring to be completely eliminated. Also the visible display of the terminal to be wired cooperates with a buzzer indicating a correct wiring to cause the operator to decrease in mental burden born by him as well as increasing the operational efficiency.

While the invention has been illustrated and described in conjunction with single preferred embodiment thereof it is to be understood that various changes and modification may be resorted to without departing from the spirit and scope of the invention.

What we claim is:

1. Apparatus for displaying wiring instructions and checking connections made in wiring electrical circuitry having a plurality of terminals to be wired, said apparatus comprising a tape reader for reading out from a punched tape coded wiring instructions, checking means connected to said tape reader for checking the correctness of said wiring instructions, decoding means connected to said checking means for decoding said wiring instructions, memory means connected to said decoding means for memorizing said decoded wiring instructions, display means connected to said memory means for visually displaying said decoded wiring instructions, control means connected to said tape reader and said memory means to control the operation of said tape reader and memory means, a wire wrap tool for making connections to said terminals in accordance with said wiring instructions, connection signal cards for applying a signal to a selected terminal to be wired in accordance with the wiring instructions displayed on said display means, means connecting said wire wrap tool to said control means to transmit to said control means a confirmation signal when said wire wrap tool engages said selected terminal and an alarm signal when said tool engages a terminal other than said selected terminal, indicating means connected to said control means for indicating when a correct connection has been made, alarm means connected with said control means for giving an alarm when an incorrect connection is made, operating means connected to said control means for advancing said tape reader to instructions for the next connection and for erasing said previous instructions from said memory means, and means for locking said operating means until said confirmation signal is transmitted from said wire wrap tool to said control means.

References Cited

UNITED STATES PATENTS

| | | | |
|---|---|---|---|
| 3,052,842 | 9/1962 | Frohman et al. | 324—73 XR |
| 3,065,414 | 11/1962 | Sears et al. | 324—73 XR |
| 3,246,240 | 4/1966 | Arnold et al. | 324—73 |
| 3,250,992 | 5/1966 | Cronkite et al. | 324—66 |
| 3,407,480 | 10/1968 | Hill et al. | 324—73 XR |

GERARD R. STRECKER, Primary Examiner

U.S. Cl. X.R.

29—203, 593; 324—51